United States Patent
Xu et al.

(10) Patent No.: US 11,120,191 B2
(45) Date of Patent: *Sep. 14, 2021

(54) MULTI-TIER CO-PLACEMENT FOR INTEGRATED CIRCUITRY

(71) Applicant: Arm Limited, Cambridge (GB)

(72) Inventors: Xiaoqing Xu, Austin, TX (US); Brian Tracy Cline, Austin, TX (US); Stephen Lewis Moore, Austin, TX (US); Saurabh Pijuskumar Sinha, San Antonio, TX (US)

(73) Assignee: Arm Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,471

(22) Filed: Mar. 16, 2020

(65) Prior Publication Data
US 2020/0218845 A1 Jul. 9, 2020

Related U.S. Application Data

(63) Continuation of application No. 15/939,047, filed on Mar. 28, 2018, now Pat. No. 10,599,806.

(51) Int. Cl.
*G06F 30/392* (2020.01)
*H01L 27/02* (2006.01)
*H01L 23/522* (2006.01)
*G06F 111/04* (2020.01)
*G06F 111/20* (2020.01)

(52) U.S. Cl.
CPC ........ *G06F 30/392* (2020.01); *H01L 23/5226* (2013.01); *H01L 27/0207* (2013.01); *G06F 2111/04* (2020.01); *G06F 2111/20* (2020.01)

(58) Field of Classification Search
CPC ............... G06F 30/392; G06F 2111/04; H01L 23/5226; H01L 27/0207
USPC .......................................... 716/118, 124, 126
See application file for complete search history.

(56) References Cited

U.S. PATENT DOCUMENTS

| | | | | |
|---|---|---|---|---|
| 9,171,608 B2 * | 10/2015 | Xie etal. | ............. | H01L 27/0688 |
| 9,483,598 B2 * | 11/2016 | Lim etal. | ............. | G06F 30/394 |
| 9,583,179 B2 * | 2/2017 | Xie etal. | ............. | H01L 27/1108 |
| 10,599,806 B2 * | 3/2020 | Xu etal. | ............. | H01L 27/0207 |

* cited by examiner

*Primary Examiner* — Sun J Lin
(74) *Attorney, Agent, or Firm* — Pramudji Law Group PLLC; Ari Pramudji

(57) ABSTRACT

Various implementations described herein are directed to a method that defines tiers of an integrated circuit having standard cells placed adjacent to each other in a multi-tier placement. The integrated circuit includes multi-tier nets connected with inter-tier connections. The method includes pairing inter-tier connections as inter-tier-connection pairs belonging to a same net. The method includes grouping standard cells in groups with or without inter-tier-connection pairs from the tiers. The method includes relating the standard cells with or without inter-tier-connection pairs within each group from the groups by generating a multi-tier fence boundary around physical locations of the standard cells with or without inter-tier-connection pairs. The method includes iteratively adjusting a location of the standard cells with or without a location of inter-tier connections so as to converge the location of the standard cells with or without the location of the inter-tier connections to optimized locations or legal locations.

20 Claims, 13 Drawing Sheets

MULTI-TIER CO-PLACEMENT FOR INTEGRATED CIRCUITRY

CROSS-REFERENCE TO RELATED APPLICATIONS

This application is a continuation of patent application number U.S. Ser. No. 15/939,047, filed 2018 Mar. 28, the disclosure of which is herein incorporated by reference.

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In modern manufacturing of integrated circuits, conventional cell architecture designs are typically generated with two-dimensional Electronic Design Automation (EDA) tools that are inefficient and cumbersome to employ. Some 2D design flows may directly adopt a 2D placement solution to determine the standard cell and inter-tier via locations, with limited results for three-dimensional (3D) optimizations. Some other 2D design flows propose block partitioning for 3D optimizations across multiple tiers. However, the inter-tier via locations are typically determined by the 2D placement solution from a single tier, which lacks co-optimization between multiple tiers.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein refer to and are directed to multi-tier co-placement for integrated circuitry including, e.g., three-dimensional integrated circuitry (3DIC). As described herein below, various 3DIC design methodologies are provided for multi-tier co-placement of standard cells and/or inter-tier vias. The co-placement may be realized with an iterative bounding procedure and a placement director (or engine). The iterative bounding procedure may be implemented with multi-tier (region) fence bounding, clustering/grouping of standard cells and/or inter-tier vias. The multi-tier (region) fence bounding, clustering/grouping, may be implemented with Electronic Design Automation (EDA) interfaces, such as, e.g., standard cell clustering, multi-tier fences, and so on. The iterative multi-tier (region) fence bounding (or clustering or groups) is not limited to pair-wise standard cells/inter-tier vias, but extendable to grouping/clustering a set of standard cells/inter-tier vias across tiers. For quality of results, iterative multi-tier fence bounding techniques described herein provide an iterative shrinking scheme for bounding boxes of groups of standard cells and/or inter-tier vias. The placement director (or engine) may be a 2D or 3D placement engine. The co-placement of standard cells/inter-tier vias makes final locations of inter-tier vias easily adaptable to an arbitrary grid structure of inter-tier vias. If co-placement is implemented with a 2D placement engine, the iterative bounding may converge the locations of inter-tier vias to an arbitrary grid structure. Co-placement may be implemented with a 3D placement engine, which may take the placement outcome and decide the locations of inter-tier vias based on an arbitrary grid structure. Various implementations described herein are not limited to two-tier 3DICs, but extendable to co-placement of standard cells and inter-tier vias among an arbitrary number of given tiers. Various implementations described herein may be adaptable to various types of 3D technology, such as, e.g., monolithic 3D, face-to-face bonding, through-silicon-via (TSV), etc. Further, various implementations described herein may obtain improved quality of results for 3DIC design using 2D EDA tools.

Various implementations of multi-tier co-placement for integrated circuitry will now be described in detail herein with reference to FIGS. 1A-9.

Figure 1A:
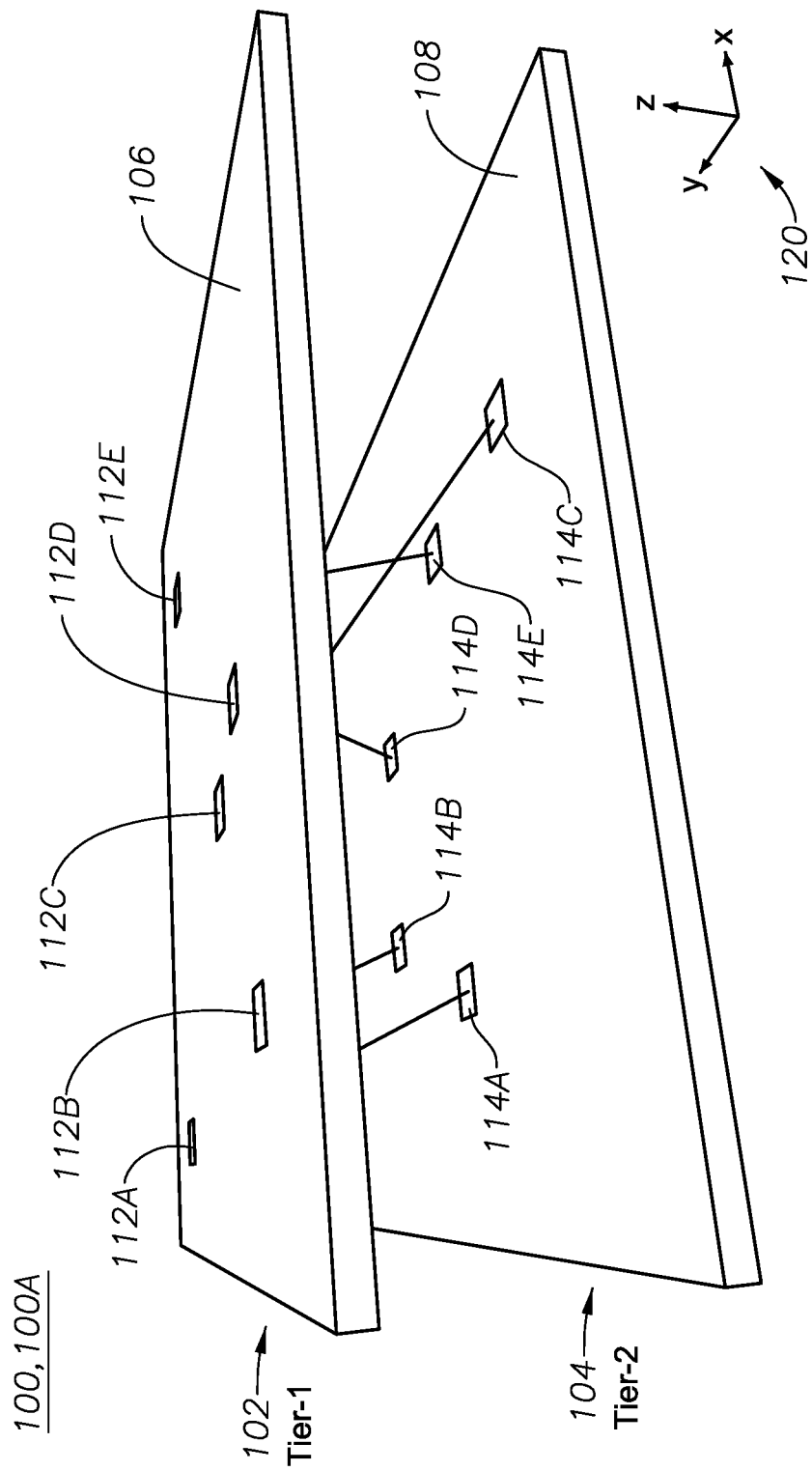
FIGS. 1A-1B illustrate perspective diagrams of a multi-tier integrated circuit in accordance with various implementations described herein.
Figure 1B:
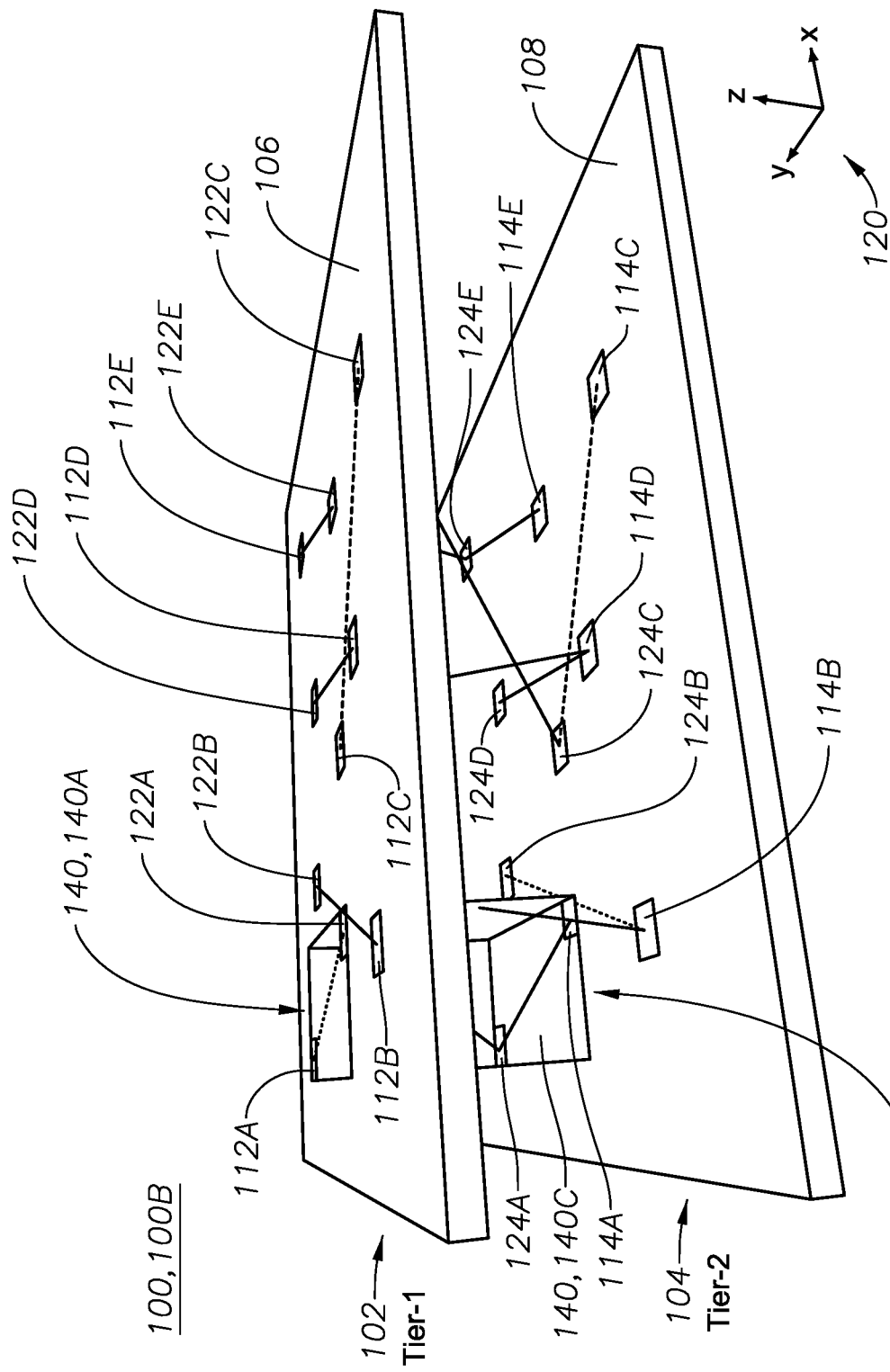

FIGS. 1A-1B illustrate perspective view diagrams 100A, 100B of a multi-tier integrated circuit 100 according to various implementations described herein. In some instances, the multi-tier integrated circuit (IC) 100 may be referred as a three-dimensional integrated circuit (3DIC) having multiple layers arranged with a multi-tier architecture. The multi-tier IC 100 is oriented with an x, y, z directional configuration 120.

As shown in FIG. 1A, the multi-tier integrated circuit 100 may include a first tier 102 and a second tier 104 that are defined as part of the integrated circuit 100, which may include multiple standard cells 112, 114 that are placed adjacent to each other in a multi-tier placement. In some instances, the multi-tier integrated circuit (IC) 100 includes the multiple standard cells 112, 114 along with inter-tier vias, and as described herein below, a multi-tier net includes inter-tier connections between the first tier 102 and the second tier 104. The first tier 102 may be embodied with a first substrate layer 106 having one or more first standard cells 112 embedded therein (or as part thereof), and the second tier 104 may be embodied with a second substrate layer 108 having one or more second standard cells 114 embedded therein (or as part thereof). Further, the multi-tier IC 100 may include the multiple tiers 102, 104 that are parallel to each other, and each tier 102, 104 of the multi-tiered structure may be referred to as a layer. Thus, for instance, the first tier 102 may be a first layer, the second tier 104 may be a second layer that is parallel to the first layer, and the multiple layers are disposed to overlie each other such that the first tier 102 overlies the second tier 104, or vice versa.

The one or more first standard cells 112 of the first tier 102 may include a first anchor cell 112A, a second anchor cell 112B, a third anchor cell 112C, a fourth anchor cell 112D, and a fifth anchor cell 112E. The one or more second standard cells 114 of the second tier 104 may include a first anchor cell 114A, a second anchor cell 114B, a third anchor cell 114C, a fourth anchor cell 114D, and a fifth anchor cell 114E. As shown, each of the first anchor cells 112 from the first tier 102 may be paired with each of the second anchor cells 114 from the second tier 114. For instance, the first anchor cell 112A in the first tier 102 may be paired with the first anchor cell 114A in the second tier 104 by grouping the first anchor cell 112A and the second anchor cell 114A in a multi-tier net and by generating a multi-tier (3D) fence boundary 140 around the multi-tier net. Similarly, as shown, the other anchor cells 112B, 112C, 112D, 112E in the first tier 102 may be paired with corresponding anchor cells 114B, 114C, 114D, 114E in the second tier 104. In some implementations, the multi-tier (3D) fence boundary 140 may be referred to as a region fence, a region fence boundary, and/or a fence boundary.

The multi-tier (3D) fence boundary 140 may include multiple components (or parts), e.g., including a first rectangular region 140A, a second rectangular region 140B, and a vertically traversing region 140C. It should be appreciated that vertically traversing region 140C is for illustration purposes, and thus, for the actual physical implementation, vertically traversing region 140C may not exist. For instance, as shown in FIG. 1B, the first rectangular region 140A may be defined within an area (or some portion thereof) of the first tier 102 that surrounds the first anchor cell 112A and the first proxy cell 122A in the first tier 102. The second rectangular region 140B may be defined within an area (or some portion thereof) of the second tier 104 that surrounds the first anchor cell 114A and the second proxy cell 124A in the second tier 104. The vertically traversing region 140C may be defined between the first rectangular region 140A and the second rectangular region 140B that extends between the first tier 102 and the second tier 104. In various implementations, a proxy cell refers to a substitute anchor cell that serves as a stand-in anchor cell that represents an anchor cell disposed on a different tier, which may also be referred to as a pseudo cell, a buffer cell, or a surrogate anchor cell.

In reference to FIG. 1B, one or more cells (e.g., 112A, 114A) of the multiple standard cells 112, 114 may be selected from the first tier 102 and the second tier 104 including selecting the first anchor cell 112A from the first tier 102 and also selecting the first anchor cell 114A from the second tier 104. Further, the first anchor cell 112A in the first tier 102 may be related to the first anchor cell 114A in the second tier 104 by adding (or disposing) a first proxy cell 122A in the first tier 102 in a location relative to the position (or location) of the first anchor cell 114A in the second tier 104 and by adding (or disposing) a second proxy cell 124A in the second tier 104 in another location relative to the position (or location) of the first anchor cell 112A in the first tier 102. In various implementations, as described herein, the term 'position' may refer to the term 'location', wherein these terms may be considered interchangeable without altering the scope of the present disclosure. Therefore, in some instances, the first anchor cell 112A in the first tier 102 may be paired with the first anchor cell 114A in the second tier 104 by grouping the first anchor cell 112A (from the first tier 102), the first proxy cell 122A (from the first tier 102), the first anchor cell 114A (from the second tier 104), and the second proxy cell 124A (from the second tier 104) in the multi-tier net and generating the multi-tier fence boundary 140 around the entire multi-tier net. In this instance, as shown in FIG. 1B, the multi-tier fence boundary 140 may be embodied as a three-dimensional (3D) multi-tier fence boundary. Similarly, as shown, the other anchor cells 112B, 112C, 112D, 112E in the first tier 102 may be grouped in other multi-tier nets with corresponding proxy cells 122B, 122C, 122D, 122E (from the first tier 102), corresponding anchor cells 114B, 114C, 114D, 114E (from the second tier 104), and corresponding proxy cells 124B, 124C, 124D, 124E (from the second tier 104). In this instance, each grouping may include its own multi-tier fence boundary around each entire multi-tier net grouping.

As will be described herein below, the position (or location) of the first anchor cell 114A in the second tier 104 may be iteratively adjusted with respect to the first anchor cell 112A in the first tier 102 so that these cells 114A, 112A may be moved closer to each other in their respective tiers 102, 104. The movement may be achieved by fixing locations of the first proxy cell 122A (from the first tier 102) and the second proxy cell 124A (from the second tier 104) in the multi-tier net by contracting (or shrinking) the multi-tier fence boundary 140 so as to thereby converge the position (or location) of the first anchor cell 114A in the second tier 104 with the position (or location) of the first anchor cell 112A in the first tier 102 proximate to a same location (or position). Further, as will be described herein below, the multi-tier integrated circuit (IC) 100 may be manufactured, or caused to be manufactured, with the first and second anchor cells 112A, 114A placed adjacent to each other in the multi-tier placement based on the adjusted position (or location) of the second anchor cell 114A in the second tier 104, or vice versa. The term "position" and the term "location" have similar meanings, and thus, these terms "position" and "location" may be interchangeably applied in a similar manner.

FIGS. 2A-2F illustrate top-view diagrams 200A, 200B, 200C, 200D, 200E, 200F of the multiple tiers 102, 104 in accordance with various implementations described herein and also in reference to the previous discussion related to FIGS. 1A-1B.

Figure 2A:
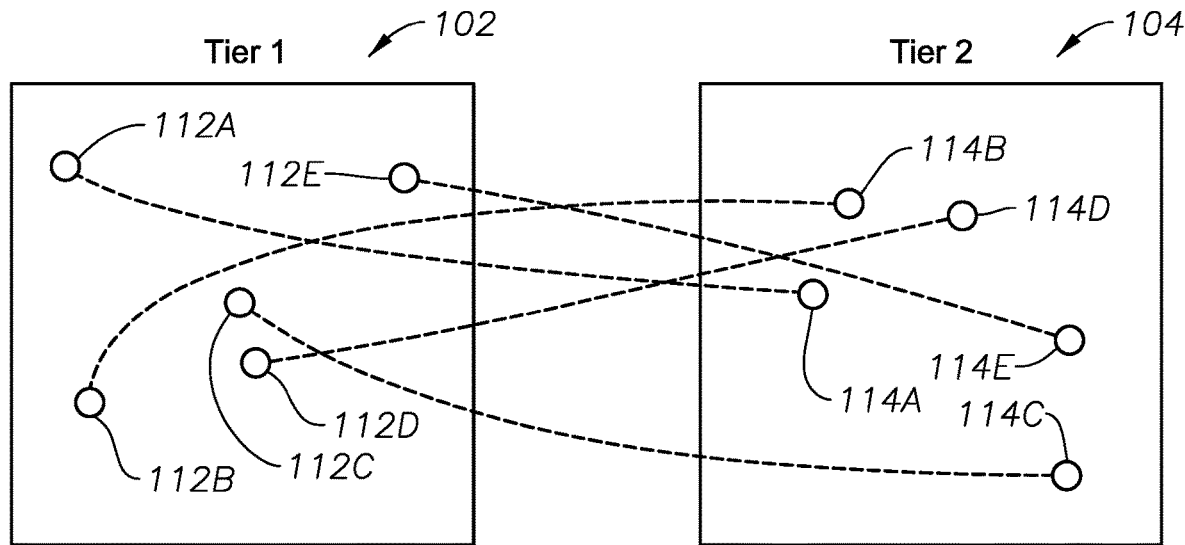
FIGS. 2A-2F illustrate two-dimensional (2D) top-view diagrams of multiple tiers in accordance with various implementations described herein.
Figure 2B:
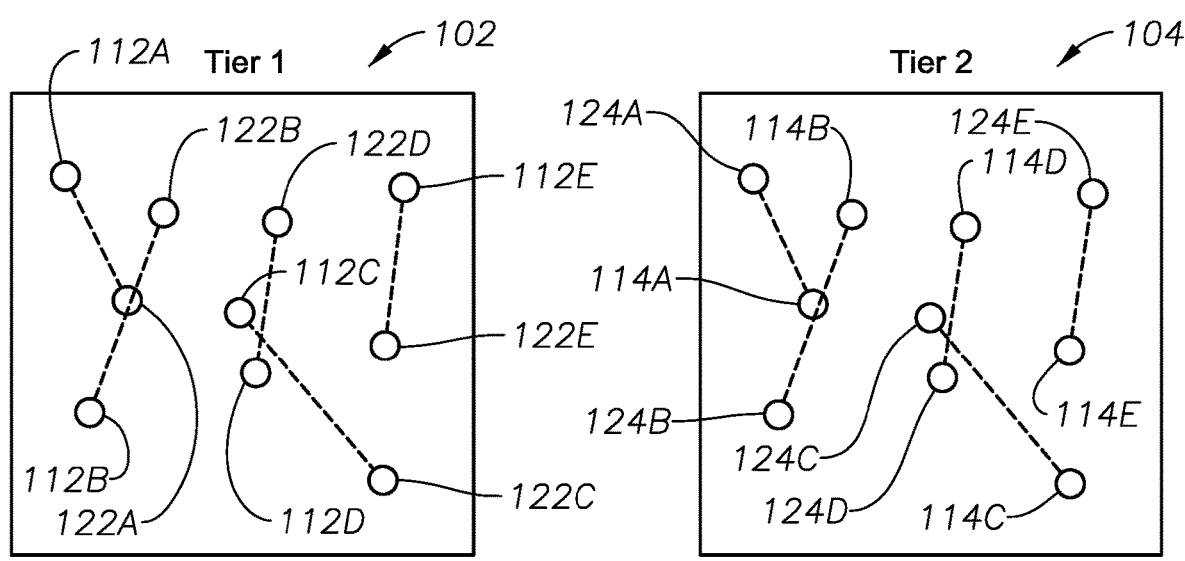
Figure 2C:
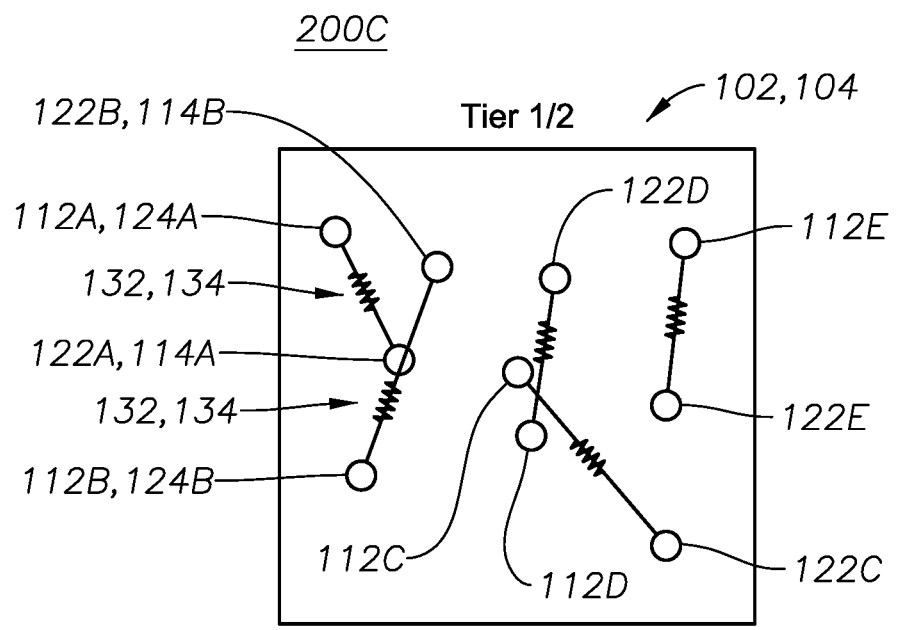
Figure 2D:
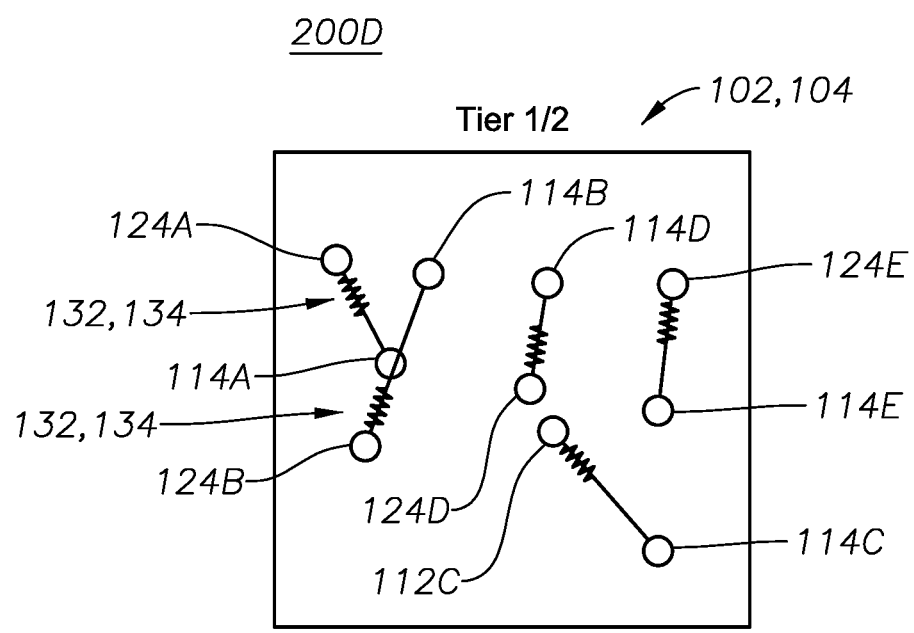
Figure 2E:
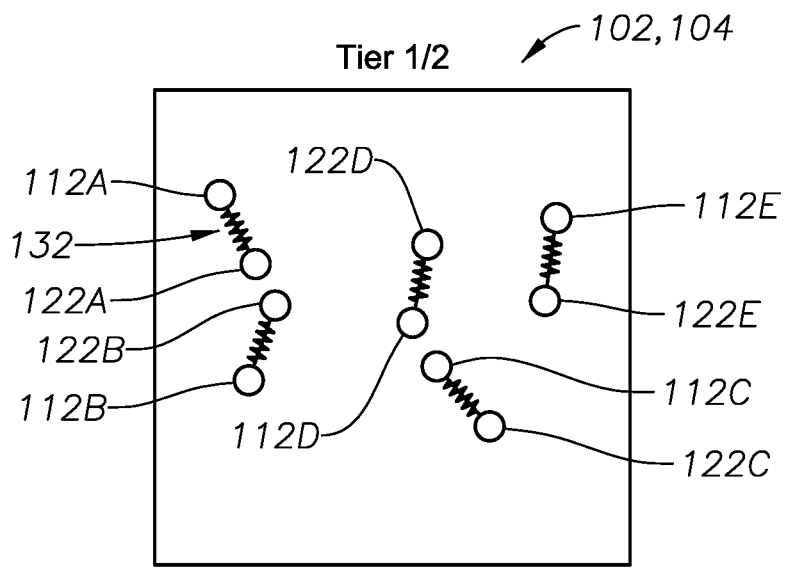
Figure 2F:
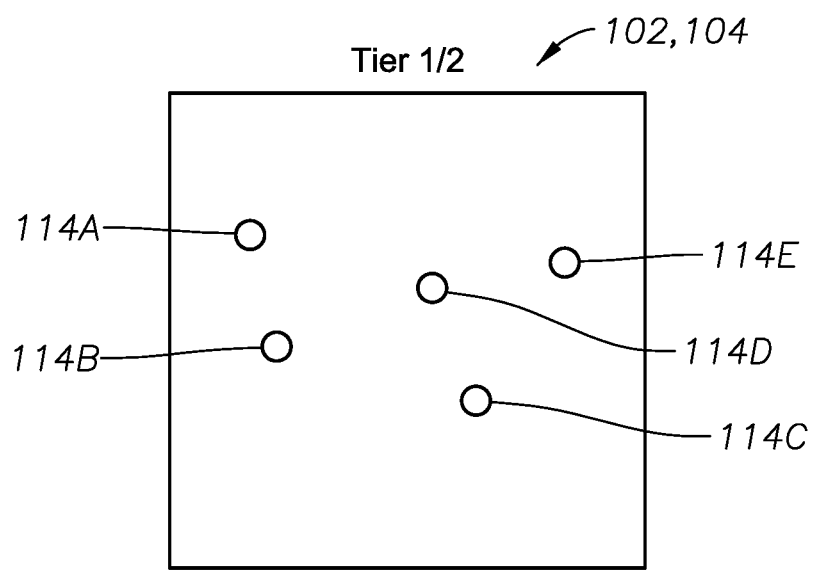

In particular, FIG. 2A shows defining the first tier 102 and the second tier 104 of the multi-tier integrated circuit 100 having the multiple standard cells 112A-112E, 114A-114E placed adjacent to each other in a multi-tier placement. As shown in FIG. 2A, each of the anchor cells 112A, 112B, 112C, 112D, 112E in the first tier 102 may be paired with each of the corresponding anchor cells 114A, 114B, 114C, 114D, 114E in the second tier 104. As shown in FIG. 2B, each of the proxy cells 122A, 122B, 122C, 122D, 122E in the first tier 102 may be associated with (e.g., virtually related to or virtual instances of) each of the corresponding anchor cells 112A, 112B, 112C, 112D, 112E in the first tier 102. Further, each of the proxy cells 124A, 124B, 124C, 124D, 124E in the second tier 104 may be associated with (e.g., virtually related to or virtual instances of) each of the corresponding anchor cells 114A, 114B, 114C, 114D, 114E in the second tier 104.

In this instance, e.g., FIGS. 2A-2B show relating the first anchor cell 112A in the first tier 102 to the first anchor cell 114A in the second tier 104 by adding (or disposing) the first proxy cell 122A in the first tier 102 in a location relative to the position (or location) of the first anchor cell 114A in the second tier 104 by adding (or disposing) a second proxy cell 124A in the second tier 104 in another location relative to the position (or location) of the first anchor cell 112A in the first tier 102.

In reference to architecture and block-level partitioning and initial placement, FIG. 2A demonstrates locations of a set of standard cells and/or inter-tier vias, denoted by circles. The dashed lines connects pairs of two circles, wherein two groups of standard cells and/or inter-tier vias are bounded across multiple tiers, such as the first tier 102 and the second tier 104. This diagram refers to a set of inter-tier vias belonging to a same electrical connection, and this example provides various inter-tier-via locations (valid inter-tier-via locations are described below in reference to FIG. 2F), for a pair of inter-tier vias belonging to the same electrical connection, across two tiers, that align with each other in the x-y coordinate so as to enable such grid alignment.

FIGS. 2C-2F show iteratively adjusting the positions of the anchor cells 112A, 112B, 112C, 112D, 112E in the first tier 102 and the positions of anchor cells 114A, 114B, 114C, 114D, 114E in the second tier 104 closer to each other by fixing the locations of the proxy cells 122A, 122B, 122C, 122D, 122E and the locations of the proxy cells 124A, 124B, 124C, 124D, 124E in the multi-tier net. In some cases, these proxy cells 124A-124E may not belong to a single electrical net, but may belong to a single bus, wherein a bus may refer to a collection of nets, and wherein each net may be a multi-tier net. In some instances, this may be achieved by contracting the multi-tier (3D) fence boundary 140 (e.g., as shown in FIG. 1B) so as to thereby converge the position (or location) of the anchor cells 114A, 114B, 114C, 114D, 114E in the second tier 104 and the position (or location) of the anchor cells 112A, 112B, 112C, 112D, 112E in the first tier 102 proximate to the same location (or position). Generally, the term "position" and the term "location" have similar meanings, and thus, these terms "position" and "location" may be interchangeably applied in a similar manner.

For instance, in reference to FIGS. 2C-2F, the position of the first anchor cell 114A in the second tier 104 may be iteratively adjusted with respect to the first anchor cell 112A in the first tier 102 closer to each other by fixing the location of the first proxy cell 122A and the second proxy cell 124A in the multi-tier net. As described above, this may be achieved by contracting the multi-tier fence boundary 140 (as shown in FIG. 1B) so as to thereby converge the location of the first anchor cell 114A from the second tier 104 and the position of the first anchor cell 112A from the first tier 102 proximate to the same location (or position).

In some implementations, in reference to FIGS. 2C-2F, first forces 132 may be applied between the anchor cells 114A, 114B, 114C, 114D, 114E in the second tier 104 and the proxy cells 124A, 124B, 124C, 124D, 124E so that the position of the anchor cells 114A, 114B, 114C, 114D, 114E in the second tier 104 and the position of the anchor cells 112A, 112B, 112C, 112D, 112E in the first tier 102 converge closer to each other. For instance, a first force 132 may be applied between the first anchor cell 114A in the second tier 104 and the first proxy cell 124A in the second tier 104, and between the first anchor cell 112 in the first tier and the first proxy cell 122A in the first tier, such that the position of the first anchor cell 114A in the second tier 104 and the first anchor cell 112A in the first tier 102, converges to the same location.

Similarly, in some implementations, second forces 134 may be applied between the anchor cells 112A, 112B, 112C, 112D, 112E in the first tier 102 and the proxy cells 124A, 124B, 124C, 124D, 124E so that the position of the anchor cells 114A, 114B, 114C, 114D, 114E in the second tier 104 and the position of the anchor cells 112A, 112B, 112C, 112D, 112E in the first tier 102 converge closer to each other. For instance, a second force 134 may be applied between the first proxy cell 122A in the first tier 102 and the first anchor cell 112A in the first tier 102 such that the second force 134 substantially matches the first force 132, such that the position of the first anchor cell 114A in the second tier 104 and the position of the first anchor cell 112A in the first tier 102, converges to the same location.

Figure 3A:
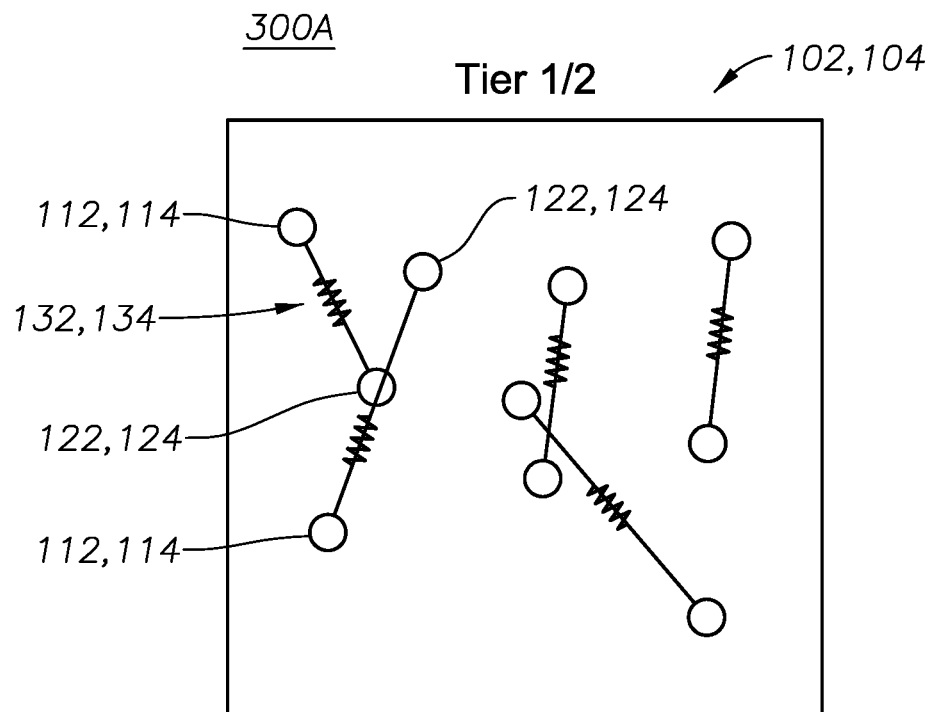
FIGS. 3A-3C show other two-dimensional (2D) top view diagrams of multiple tiers in accordance with various implementations described herein.
Figure 3B:
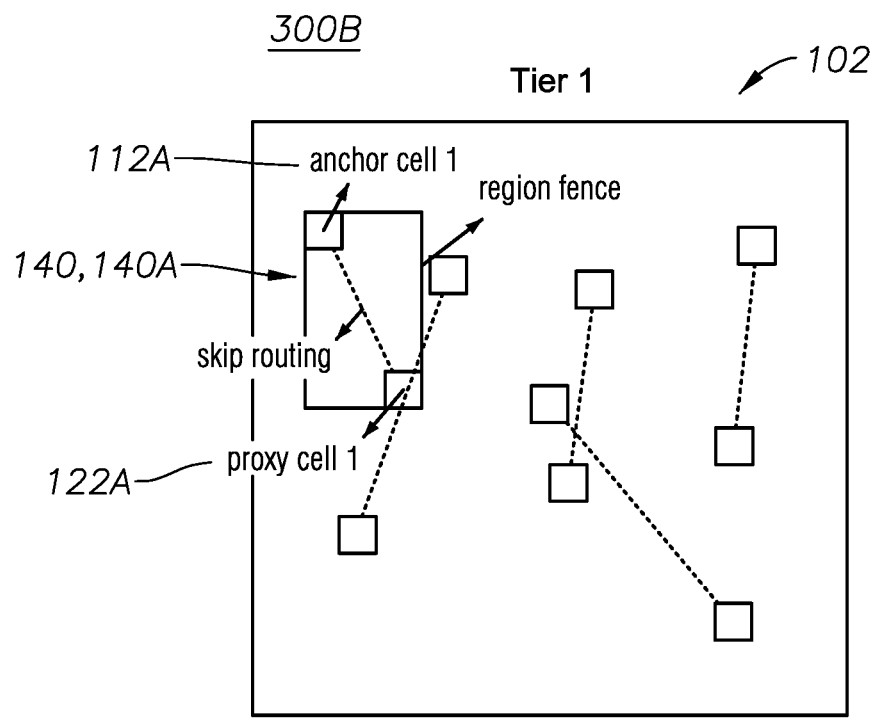
Figure 3C:
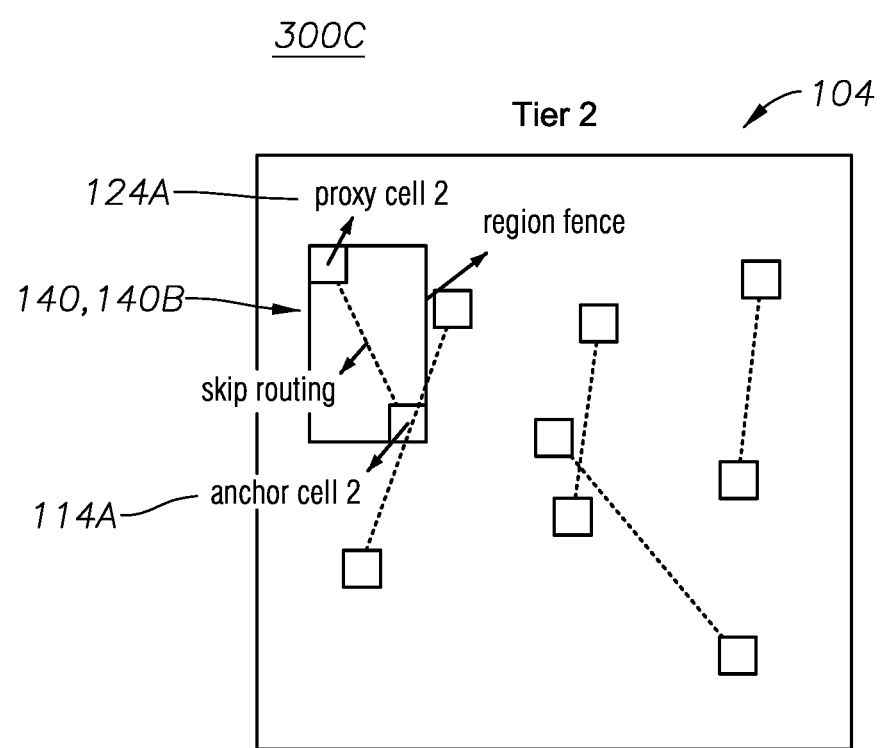

FIGS. 3A-3C show two-dimensional (2D) top views of the first tier 102 and the second tier 104 in reference to the previous discussion related to FIGS. 1A-2F.

In particular, FIG. 3A shows an example of applying the forces 132, 134 to the anchor cells 112, 114 in the first and second tiers 102, 104 in a direction towards the proxy cells 122, 124 so that the position of the anchor cells 112, 114 in the first and second tiers 102, 104 may converge closer to each other in their respective tiers 102, 104. This concept was described herein above in reference to FIG. 1A-2F.

FIG. 3A further shows an example of relating the first anchor cell in the first tier to the second anchor cell in the second tier by adding a first proxy cell in the first tier in a location relative to the position of the second anchor cell in the second tier and by adding a second proxy cell in the second tier in another location relative to the position of the first anchor cell in the first tier.

FIG. 3B shows pairing the first anchor cell 112A in the first tier 102 with the first proxy cell 122A in the first tier 102 by grouping the first anchor cell 112A and the first proxy cell 122A in the multi-tier net and by generating the multi-tier fence boundary 140, 140A in the first tier 102 around the multi-tier net. As such, FIG. 3B further shows an example of the multi-tier fence boundary 140 having the first rectangular region 140A defined within an area of the first tier 102 that surrounds the first anchor cell 112A and the first proxy cell 122A in the first tier 102.

FIG. 3C shows pairing the first anchor cell 114A in the second tier 104 with the first proxy cell 124A in the second tier 104 by grouping the first anchor cell 114A and the first proxy cell 124A in the multi-tier net and by generating the multi-tier fence boundary 140, 140B in the second tier 104 around the multi-tier net. As such, FIG. 3C further shows an example of the multi-tier fence boundary 140 having the second rectangular region 140B defined within an area of the second tier 104 that surrounds the first anchor cell 114A and the first proxy cell 124A in the second tier 104.

In some implementations, in reference to FIGS. 1A-3C, iteratively adjusting may refer to directly constraining alignment of the position of the anchor cells 114A, 114B, 114C, 114D, 114E in the second tier 104 with respect to the anchor cells 112A, 112B, 112C, 112D, 112E in the first tier 102 such that the anchor cells 112A, 112B, 112C, 112D, 112E in the first tier 102 overlie the anchor cells 114A, 114B, 114C, 114D, 114E in the second tier 104. In some implementations, iteratively adjusting may be associated with using force directed placement of the anchor cells 114A, 114B, 114C, 114D, 114E in the second tier 104 with respect to the proxy cells 124A, 124B, 124C, 124D, 124E in the second tier 104 such that the anchor cells 114A, 114B, 114C, 114D, 114E in the second tier 104 move in a direction towards the proxy cells 124A, 124B, 124C, 124D, 124E in the second tier 104 for alignment with the anchor cells 112A, 112B, 112C, 112D, 112E in the first tier 102. In some implementations, iteratively adjusting may include using small-scale step adjustments (e.g., as shown in the sequence of FIGS. 2C-2F) over a number of iterations to incrementally move the anchor cells 114A, 114B, 114C, 114D, 114E in the second tier 104 closer to the proxy cells 124A, 124B, 124C, 124D, 124E in the second tier 104 so that the position of the anchor cells 114A, 114B, 114C, 114D, 114E in the second tier 104 and the position of the anchor cells 112A, 112B, 112C, 112D, 112E in the first tier 102, converges to closer to each other.

Further, in some implementations, in reference to FIGS. 1A-3C, converging the position of the anchor cells 114A, 114B, 114C, 114D, 114E in the second tier 104 and the position of the anchor cells 112A, 112B, 112C, 112D, 112E in the first tier 102 proximate to each other refers to co-placement of the standard cells 112, 114 in the multi-tier placement. This may include co-placement of the anchor cells 112A, 112B, 112C, 112D, 112E in the first tier 102 and the anchor cells 114A, 114B, 114C, 114D, 114E in the second tier 104 such that the position of the anchor cells 114A, 114B, 114C, 114D, 114E in the second tier 104 are moved within the multi-tier fence boundary 140, 140A, 104B to the position of the proxy cells 124A, 124B, 124C, 124D, 124E in the second tier 104. This may be substantially similar to the position of the anchor cells 112A, 112B, 112C, 112D, 112E in the first tier 102.

Various implementations described herein provide for iterations with a multi-tier fence boundary, which is conceptually similar to a pulling force, e.g., a spring, between the inter-tier vias belonging to a same electrical connection. When replacing the first tier 102 with a multi-tier fence boundary, the inter-tier vias on the second tier 104 may be fixed, which further provides pulling force for the inter-tier vias on the first tier 102 through use of the multi-tier fence boundary, and vice versa. Through iterations, the multi-tier fence/pulling force may pull the inter-tier vias (belonging to the same electrical connection) to the same x-y location, namely converge to a valid solution. This iterative bounding procedure may be achieved with the multi-tier fence boundary, groups or clustering of standard cells and/or inter-tier vias.

Figure 4:
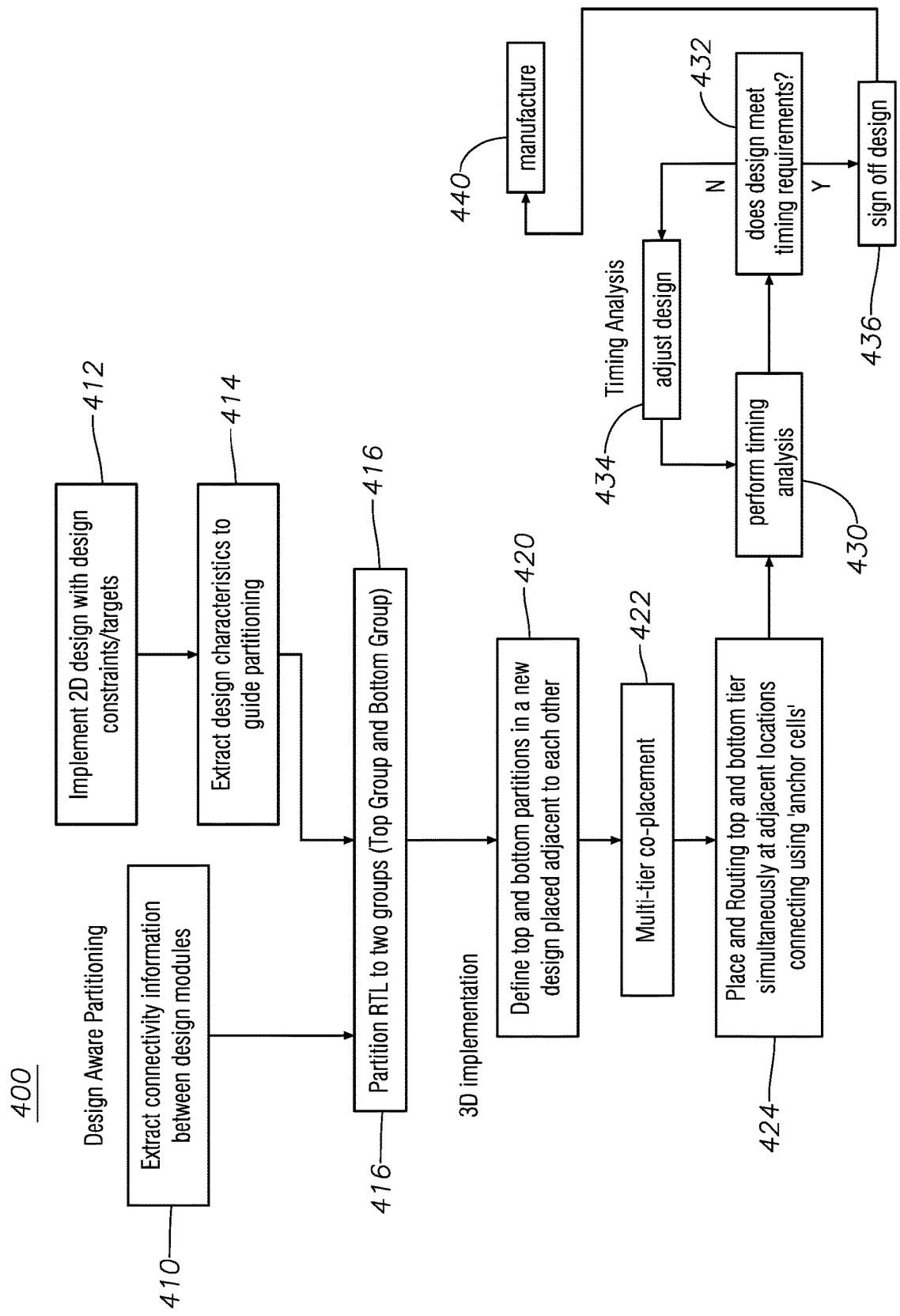
FIGS. 4-6 describe optimization methodologies that enable co-placement of standard cells and/or inter-tier vias across various multiple tiers in accordance with various implementations described herein.
Figure 5:
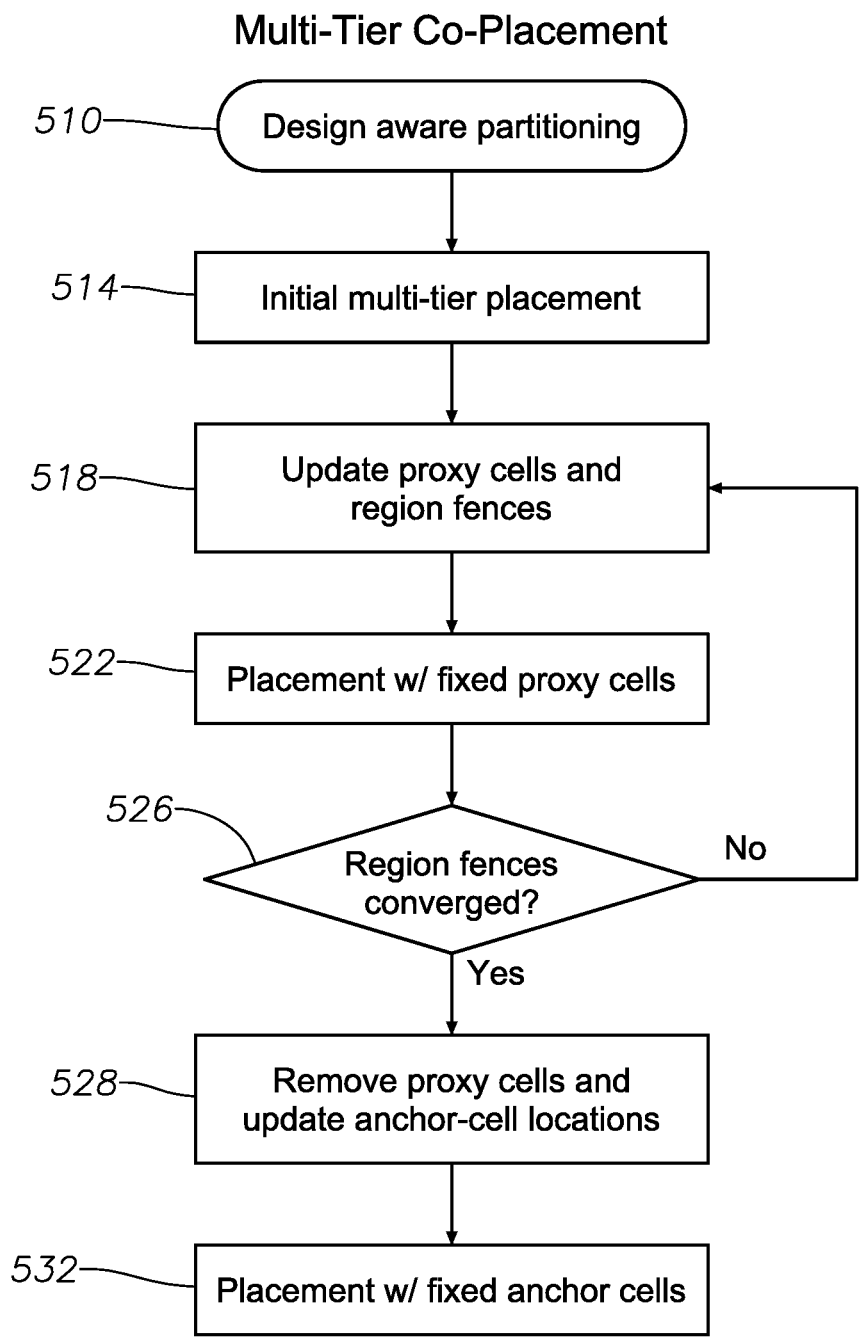
Figure 6:
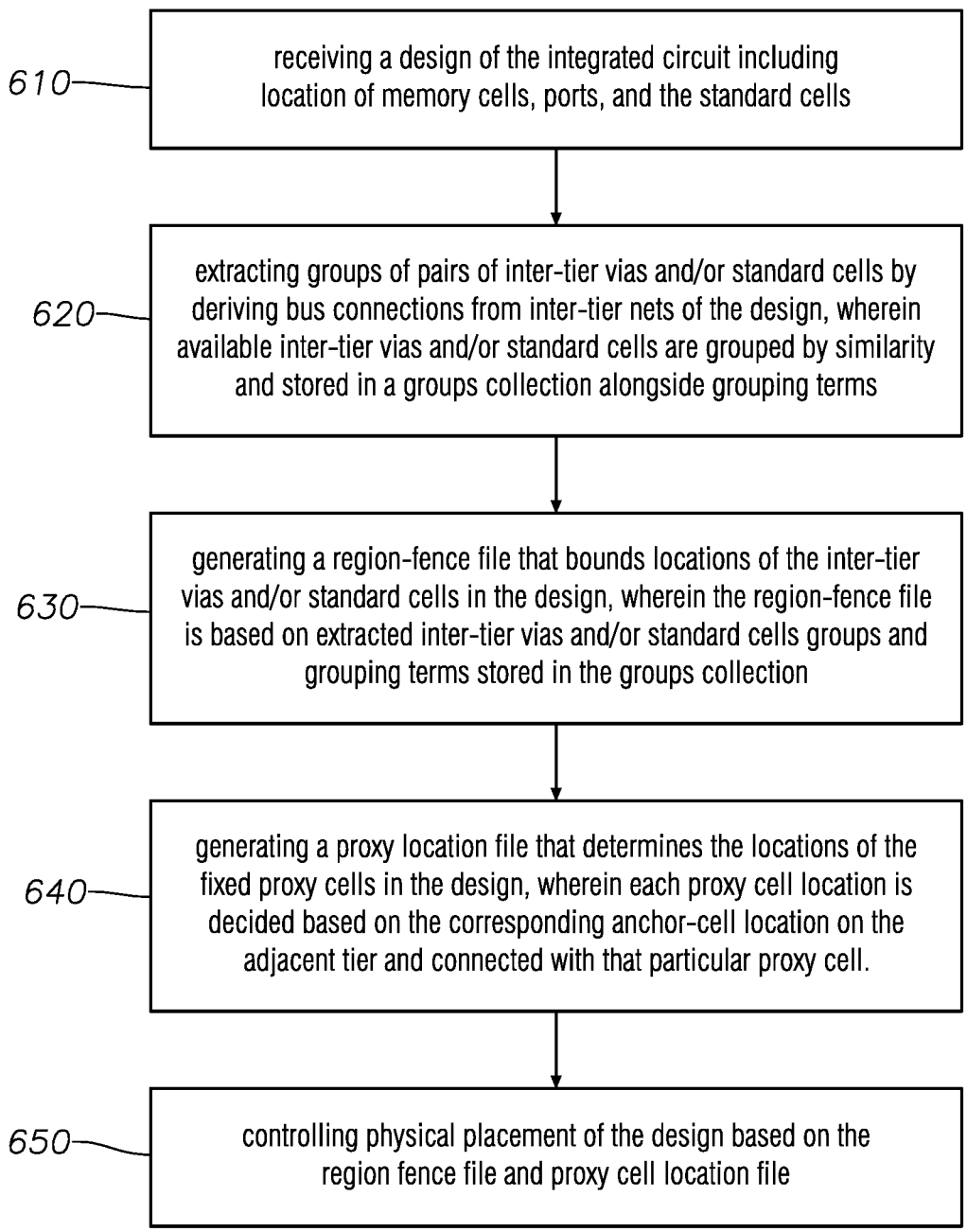

According to various implementations described herein, FIGS. 4-6 describe various optimization methodologies that enable 3D co-placement of standard cells and/or inter-tier vias across various multiple tiers of 3DIC.

FIG. 4 illustrates a process flow diagram of a method 400 for design aware partitioning in accordance with various implementations described herein.

It should be understood that even though method 400 may indicate a particular order of operation execution, in some cases, various certain portions of the operations may be executed in a different order, and on different systems. In other cases, additional operations and/or steps may be added to and/or omitted from method 400. Method 400 may be implemented in hardware and/or software. If implemented in hardware, method 400 may be implemented with various circuit components, e.g., such as described herein above in reference to FIGS. 1A-3. If implemented in software, method 400 may be implemented as a program or software instruction process that may be configured for implementing design aware partitioning as described herein. Further, if implemented in software, instructions related to implementing the method 400 may be stored in memory and/or a database. For instance, a computer or various other types of computing devices having a processor and memory may be configured to perform method 400.

Figure 8:
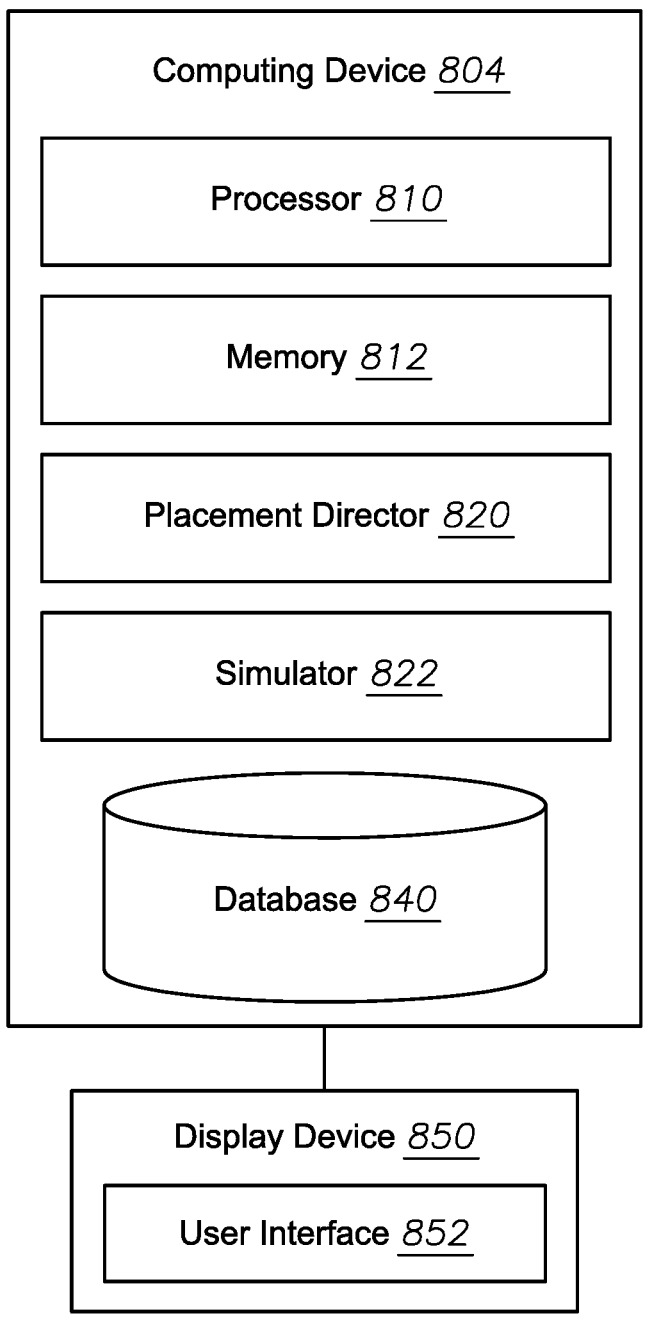
FIG. 8 illustrates a diagram of a system for multi-tier co-placement of standard cells in an integrated circuit according to implementations described herein.

As described and shown in reference to FIG. 4, method 400 may be used for manufacturing an integrated circuit (e.g., 3DIC) that implements direct co-placement of standard cells in multi-tier architecture in various types of IC applications. In some cases, method 400 may be associated with a computing device (e.g., computing device 804 as shown in FIG. 8) that provides a special purpose machine configured for manufacturing 3DIC architecture design with multi-tier co-placement of standard cells.

In reference to design aware partitioning, at block 410, method 400 may extract connectivity information between design modules for designing an integrated circuit (e.g., 3DIC). For instance, at block 412, method 400 may implement 2D design of the integrated circuit with design constraints and/or targets, and at block 414, method 400 may extract design characteristics for the integrated circuit to guide partitioning. At block 416, method 400 may partition register transfer level (RTL) code to multiple groups, such as, e.g., two groups or partitions, including a first (top) group and a second (bottom) group.

In reference to 3D implementation, at block 420, method 400 may define the first (top) and second (bottom) groups or partitions placed adjacent to each other in a new revised (or modified) design of the integrated circuit. At block 422, method 400 may provide a multi-tier co-placement of the first (top) and second (bottom) groups or partitions as first (top) and second (bottom) tiers. At block 424, method 400 may place and route the first (top) tier and the second (bottom) tier simultaneously at adjacent locations that are connected using anchor cells.

In reference to timing analysis, at block 430, method 400 may perform timing analysis. At block 432, method 400 may determine whether the new revised design meets timing requirements. If no, then method 400 may adjust the new revised design and move to block 430 to repeat the timing analysis. If yes, then at block 436, method 400 may sign-off (or approve) the new revised design. At block 440, method 400 may proceed with manufacturing or fabricating the integrated circuit with the new revised design.

In some implementations, referring to 3D implementation and timing analysis, method 400 may define multiple tiers of the integrated circuit with multiple standard cells placed adjacent to each other in a multi-tier placement, wherein the integrated circuit includes multi-tier nets connected with inter-tier connections. Method 400 may pair the inter-tier connections as inter-tier-connection pairs belonging to a same net. Method 400 may group one or more cells of the multiple standard cells in groups and/or the inter-tier-connection pairs from multiple tiers. Method 400 may relate the multiple standard cells and/or inter-tier-connection pairs within each group form the groups by generating a multi-tier fence boundary around physical locations of the multiple standard cells and/or the inter-tier-connection pairs. Method 400 may iteratively adjust a position of the multiple standard cells and/or a position of the inter-tier connections so as to converge the position of the multiple standard cells and/or the position of the inter-tier connections to optimized or legal locations. Further, method 400 may iteratively adjust the position of the multiple standard cells and/or the position of the inter-tier connections simultaneously so that the position of the multiple standard cells and/or the position of the inter-tier connections converge to the optimized or legal locations.

FIG. 5 illustrates a process flow diagram of a method 500 for design aware partitioning in accordance with various implementations described herein.

It should be understood that even though method 500 may indicate a particular order of operation execution, in some cases, various certain portions of the operations may be executed in a different order, and on different systems. In other cases, additional operations and/or steps may be added to and/or omitted from method 500. Method 500 may be implemented in hardware and/or software. If implemented in hardware, method 500 may be implemented with various circuit components, e.g., such as described herein above in reference to FIGS. 1A-4. If implemented in software, method 500 may be implemented as a program or software instruction process that may be configured for implementing design aware partitioning as described herein. Further, if implemented in software, instructions related to implementing the method 500 may be stored in memory and/or a database. For instance, a computer or various other types of computing devices having a processor and memory may be configured to perform method 500.

As described and shown in reference to FIG. 5, method 500 may be used for manufacturing an integrated circuit (e.g., 3DIC) that implements direct co-placement of standard cells in multi-tier architecture in various types of IC applications. In some cases, method 500 may be associated with a computing device (e.g., computing device 804 as shown in FIG. 8) that provides a special purpose machine configured for manufacturing 3DIC architecture design with multi-tier co-placement of standard cells.

In reference to multi-tier co-placement of a design, at block 510, method 500 may implement design aware partitioning for an integrated circuit (e.g., 3DIC). At block 514, method 500 may initialize the multi-tier placement. At block 518, method 500 may update proxy cells and multi-tier fences (or boundaries). At block 522, method 500 may provide placement of the multi-tiers with fixed proxy cells. At block 526, method 500 may determine whether the multi-tier fences have converged. If no, then method 500 returns to block 518 to repeat blocks 518 and 522. If yes, then method 500 removes the proxy cells and updates the anchor cell locations. At block 532, method 500 may provide placement of the multi-tiers with fixed anchor cells.

FIG. 6 illustrates a process flow diagram of a method 600 for design aware partitioning in accordance with various implementations described herein.

It should be understood that even though method 600 may indicate a particular order of operation execution, in some cases, various certain portions of the operations may be executed in a different order, and on different systems. In other cases, additional operations and/or steps may be added to and/or omitted from method 600. Method 600 may be implemented in hardware and/or software. If implemented in hardware, method 600 may be implemented with various circuit components, e.g., such as described herein above in reference to FIGS. 1A-5. If implemented in software, method 600 may be implemented as a program or software instruction process that may be configured for implementing design aware partitioning as described herein. Further, if implemented in software, instructions related to implementing the method 600 may be stored in memory and/or a database. For instance, a computer or various other types of computing devices having a processor and memory may be configured to perform method 600.

As described and shown in reference to FIG. 6, method 600 may be used for manufacturing an integrated circuit (e.g., 3DIC) that implements direct co-placement of standard cells in multi-tier architecture in various types of IC applications. In some cases, method 600 may be associated with a computing device (e.g., computing device 804 as shown in FIG. 8) that provides a special purpose machine configured for manufacturing 3DIC architecture design with multi-tier co-placement of standard cells.

In reference to updating proxy cells and multi-tier fences, at block 610, method 600 may receive a design of the integrated circuit including location of memory cells, ports, and standard cells. At block 620, method 600 may extract groups of pairs of inter-tier vias and/or standard cells by deriving one or more bus connections from inter-tier nets of the design, wherein available inter-tier vias and/or standard cells are grouped by similarity and stored in a groups collection alongside grouping terms. At block 630, method 600 may generate a multi-tier fence file that bounds locations of the inter-tier vias and/or standard cells in the design, wherein the multi-tier fence file is based on extracted inter-tier vias and/or standard cells groups and grouping terms stored in the groups collection. At block 640, method 600 may generate a proxy cell location file that determines the locations of the fixed proxy cells in the design, wherein each proxy cell location is decided based on the corresponding anchor cell location on the adjacent tier and that is connected with that particular proxy cell. At block 650, method 600 may control the physical placement of the design based on the multi-tier fence file and the proxy cell location file.

Various implementations described herein provide an independent optimization component that may be integrated into any physical design flow for 3DIC that follows the various design stages of partitioning, floor-planning, placement and routing. FIGS. 4-6 demonstrate various process flows for co-placement of standard cells and/or inter-tier vias. The multi-tier fence boundary may be used by a placement director (or engine), which is used to pull physical objects (e.g., standard cells) together by setting bounding boxes around these objects for a next placement iteration. The multi-tier fence boundary may be replaced with grouping/clustering of standard cells and/or inter-tier vias.

The partitioning and initial placement may be provided as an input. The multi-tier fence boundaries may be updated iteratively to constrain the next iteration of placement for each tier. In some instances, if a 2D placement engine is used, placement for all tiers may be achieved sequentially. In other instances, if a 3D placement engine is used, the placement for all tiers may be achieved sequentially or simultaneously. The convergence criteria may vary from design to design or from runs to runs, i.e., the designer may choose when to cease iterations based on design metrics, such as placement quality. When the iterations cease, the multi-tier fence boundaries may be taken as input into a physical design flow. For standard cell placement solutions from previous iterations, the designer has the option to keep or discard them. For some applications, the multi-tier fence boundaries may be embodied as multi-dimensional region-fence files (or locations) or as placement files with standard cell locations.

Figure 7:
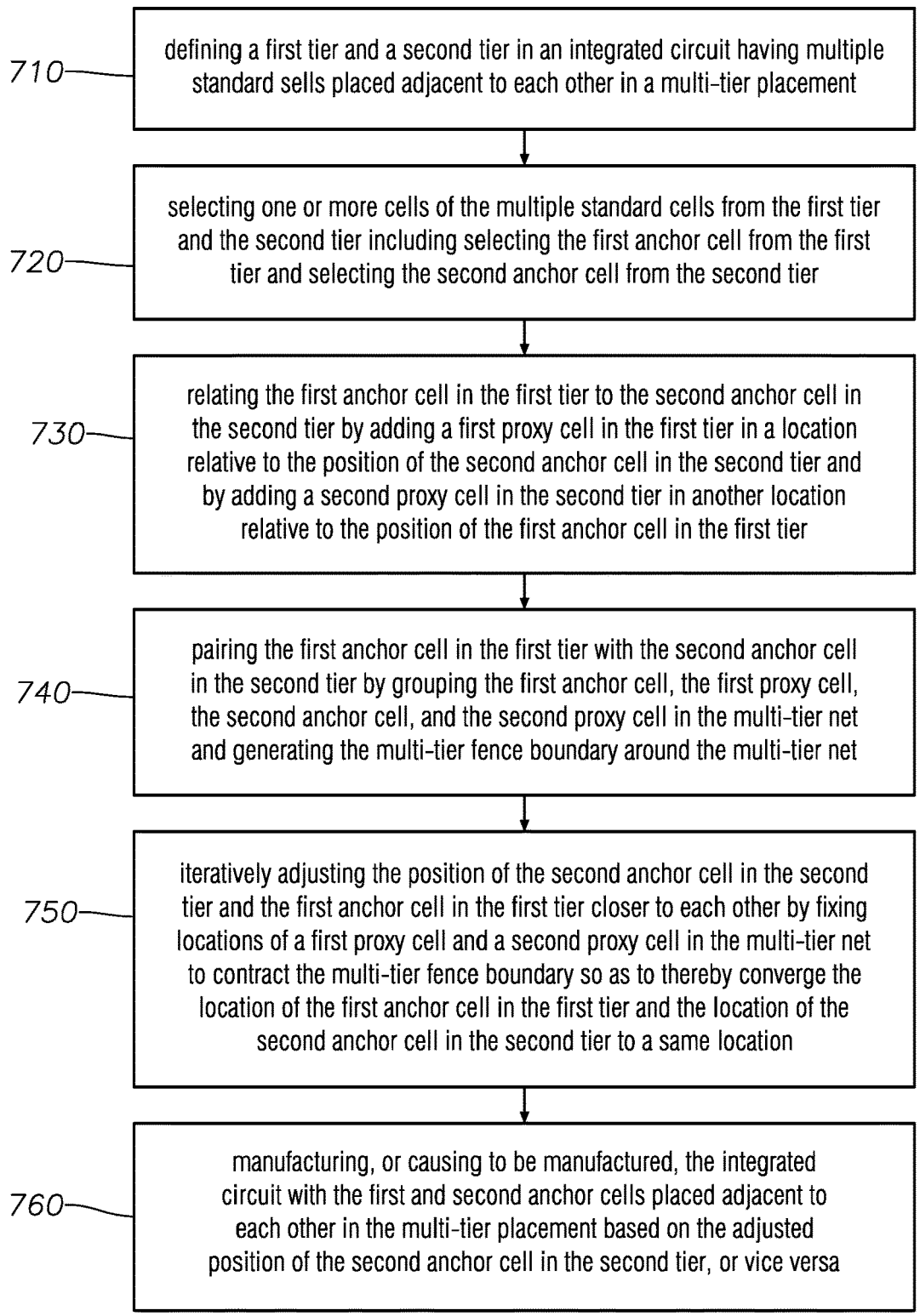
FIG. 7 illustrates a process flow diagram of a method for manufacturing an integrated circuit in accordance with various implementations described herein.

FIG. 7 illustrates a process flow diagram of a method 700 for manufacturing an integrated circuit in accordance with various implementations described herein.

It should be understood that even though method 700 may indicate a particular order of operation execution, in some cases, various certain portions of the operations may be executed in a different order, and on different systems. In other cases, additional operations and/or steps may be added to and/or omitted from method 700. Method 700 may be implemented in hardware and/or software. If implemented in hardware, method 700 may be implemented with various circuit components, e.g., such as described herein above in reference to FIGS. 1A-6. If implemented in software, method 700 may be implemented as a program or software instruction process that may be configured for implementing direct co-placement of standard cells in multi-tier architecture in various types of IC applications as described herein.

Also, if implemented in software, instructions related to implementing the method 700 may be stored in memory and/or a database. For instance, a computer or various other types of computing devices having a processor and memory may be configured to perform method 700.

As described and shown in reference to FIG. 7, method 700 may be used for manufacturing an integrated circuit (e.g., 3DIC) that implements direct co-placement of standard cells in multi-tier architecture in various types of IC applications. In some cases, method 700 may be associated with a computing device (e.g., computing device 804 as shown in FIG. 8) that provides a special purpose machine configured for manufacturing 3DIC architecture design with multi-tier co-placement of standard cells.

At block 710, method 700 may define multiple tiers including a first tier and a second tier in an integrated circuit (3DIC) having multiple standard cells placed adjacent to each other in a multi-tier placement. The integrated circuit (3DIC) may include multiple layers that are parallel to each other, and each layer of the multiple layers may be referred to as a tier. As such, the first tier may be a first layer, and the second tier may be a second layer that is parallel to the first layer. The multiple layers may be disposed to overlie each other, wherein the first tier overlies the second tier. The integrated circuit (3DIC) include the multiple standard cells along with inter-tier vias, and the multi-tier net includes inter-tier connections between the first tier and the second tier.

At block 720, method 700 may select one or more cells of the multiple standard cells from the first tier and the second tier including selecting the first anchor cell from the first tier and selecting the second anchor cell from the second tier. At block 730, method 700 may relate the first anchor cell in the first tier to the second anchor cell in the second tier by adding a first proxy cell in the first tier in a location relative to the position (or location) of the second anchor cell in the second tier and by adding a second proxy cell in the second tier in another location relative to the position (or location) of the first anchor cell in the first tier. The term "position" and the term "location" have similar meanings, and thus, these terms "position" and "location" may be interchangeably applied.

At block 740, method 700 may pair the first anchor cell in the first tier with the second anchor cell in the second tier by grouping the first anchor cell, the first proxy cell, the second anchor cell, and the second proxy cell in the multi-tier net and generating the multi-tier fence boundary around the multi-tier net. The multi-tier fence boundary includes a first rectangular region defined within an area of the first tier that surrounds the first anchor cell and the first proxy cell, and the multi-tier fence boundary includes a second rectangular region defined within an area of the second tier that surrounds the second anchor cell and the second proxy cell. The multi-tier fence boundary may further include a vertically traversing region defined between the first rectangular region and the second rectangular region that extends between the first tier and the second tier. As previously described herein, it should be appreciated that the vertically traversing region is for illustration purposes, and thus, for actual physical implementation, the vertically traversing region 140C may not exist.

At block 750, method 700 may iteratively adjust position (or location) of the second anchor cell in the second tier and the first anchor cell in the first tier closer to each other by fixing locations of a first proxy cell and a second proxy cell in the multi-tier net to contract the multi-tier fence boundary so as to thereby converge the location of first anchor cell in the first tier and the location of the second anchor cell in the second tier to a same location. In some instances, iteratively adjusting may refer to directly constraining alignment of the position (or location) of the second anchor cell in the second tier with respect to the first anchor cell in the first tier such that the first anchor cell overlies the second anchor cell. In some instances, iteratively adjusting may be associated with using force directed placement of the second anchor cell in the second tier with respect to the second proxy cell in the second tier such that the second anchor cell moves in a direction towards the second proxy cell for alignment with the first anchor cell in the first tier. In other instances, iteratively adjusting includes using small-scale step adjustments over a number of iterations to incrementally move the second anchor cell in the second tier closer to the second proxy cell in the second tier so that the position (or location) of the second anchor cell in the second tier and the position (or location) of the first anchor cell in the first tier converges proximate to each other.

In some implementations, converging the position (or location) of the second anchor cell in the second tier and the position (or location) of the first anchor cell in the first tier proximate to each other may refer to co-placement of the standard cells in the multi-tier placement. Further, this may include co-placement of the first anchor cell and the second anchor cell such that the position (or location) of the second anchor cell is moved within the multi-tier fence boundary to the position (or location) of the second proxy cell in the second tier which is substantially similar to the position (or location) of the first anchor cell in the first tier.

At block 760, method 700 may manufacture, or cause to be manufactured, the integrated circuit (3DIC) with the first and second anchor cells placed adjacent to each other in the multi-tier placement based on the adjusted position (or location) of the second anchor cell in the second tier, or vice versa.

In some implementations, method 700 may include applying a first force may be applied between the first anchor cell in the first tier and the first proxy cell in the first tier, and between the second anchor cell in the second tier and the second proxy cell in the second tier, such that the position (or location) of the first anchor cell in the first tier and the second anchor cell in the second tier, converges to a same location. Further, in some implementations, method 700 may include applying a second force between the first proxy cell in the first tier and the first anchor cell in the first tier such that the second force matches the first force so as to assist with converging the location of the second anchor cell in the second tier and the location of the first anchor cell in the first tier closer to each other. In some cases, the first force and the second force may be the same.

FIG. 8 illustrates a diagram 800 of a system 100 for multi-tier co-placement of standard cells in an integrated circuit, such as, e.g., 3DIC, in accordance with various implementations described herein.

In reference to FIG. 8, the system 800 may include a computer based system configured to direct co-placement of standard cells in multi-tier architecture. The system 800 may be associated with a computing device 804 implemented as a special purpose machine configured for multi-tier co-placement of standard cells, as described herein. In some instances, the computing device 804 may include any standard element(s) and/or component(s), including at least one processor(s) 810, memory 812 (e.g., non-transitory computer-readable storage medium), one or more database(s) 840, power, peripherals, and various other computing elements and/or components that may not be specifically shown in FIG. 8. The computing device 804 may include instructions stored on the non-transitory computer-readable medium 812 that are executable by the processor 810. The computing device 804 may be associated with a display device 850 (e.g., monitor or other display) that may be used to provide a user interface (UI) 852, such as, e.g., a graphical user interface (GUI). In some instances, the UI 852 may be utilized to receive various parameters and/or preferences from a user for managing, operating, and/or utilizing the computing device 804 for multi-tier co-placement. Therefore, the computing device 804 may include the display device 850 for providing output to a user, and the display device 850 may include the UI 852 for receiving input from the user.

In various implementations, the computing device 804 may be configured to implement a methodology for manufacturing an integrated circuit (e.g., 3DIC) based on multi-tier co-placement of standard cells. For instance, the computing device 804 may be configured for 3DIC design methodology for the multi-tier co-placement of standard cells and/or inter-tier vias, and co-placement may be realized with iterative bounding schemes and procedures using a co-placement engine. The co-placement of standard cells and/or inter-tier vias makes final locations of inter-tier vias easily adaptable to an arbitrary grid structure of inter-tier vias. This multi-tier co-placement concept described herein should not be limited to two-tier 3DICs and, as such, may be adapted to co-placement of standard cells and inter-tier vias among an arbitrary number of given tiers. Also, this multi-tier co-placement concept may be adapted to various types of 3D technology, such as monolithic 3D, face-to-face bonding, through-silicon-via (TSV), and so on.

In reference to FIG. 8, the computing device 804 may include a placement director (or engine) 820 for generating direct co-placement files for standard cells in multi-tier architecture. In some instances, the computing device 804 may utilize the placement director (or engine) 820 for designing 3DIC architecture with multi-tier co-placement of standard cells and/or inter-tier vias in accordance with methods described herein.

The placement director (or engine) 820 may be configured to cause the at least one processor 810 to define multiple tiers of the 3DIC with multiple standard cells placed adjacent to each other in a multi-tier placement, wherein the 3DIC includes multi-tier nets connected with inter-tier connections. In some instances, the multiple tiers may include a first tier and a second tier, and the first tier and the second tier include multiple standard cells placed adjacent to each other in the multi-tier placement. Also, defining the multiple tiers may include selecting one or more cells of the multiple standard cells from the first tier and the second tier including selecting a first anchor cell from the first tier and selecting a second anchor cell from the second tier. Further, defining the multiple tiers may include relating the first anchor cell in the first tier to the second anchor cell in the second tier by adding a first proxy cell in the first tier in a location relative to the position (or location) of the second anchor cell in the second tier and by adding a second proxy cell in the second tier in another location relative to the position (or location) of the first anchor cell in the first tier. The term "position" and the term "location" have similar meanings, and thus, these terms "position" and "location" may be interchangeably applied.

The placement director (or engine) 820 may be configured to cause the at least one processor 810 to pair inter-tier connections as inter-tier-connection pairs belonging to a same net (i.e., multi-tier net). The placement director (or engine) 820 may cause the at least one processor 810 to group one or more cells of the multiple standard cells in groups and/or the inter-tier-connection pairs from multiple tiers. The placement director (or engine) 820 may cause the at least one processor 810 to relate the multiple standard cells and/or inter-tier-connection pairs within each group from the groups by generating a multi-tier fence boundary around physical locations of the multiple standard cells and/or the inter-tier-connection pairs. In some instances, pairing the inter-tier connections as the inter-tier-connection pairs belonging to the same net includes pairing the first anchor cell in the first tier with the second anchor cell in the second tier by grouping the first anchor cell, the first proxy cell, the second anchor cell and the second proxy cell in a same multi-tier net and by generating a multi-tier fence boundary around the multi-tier net.

The placement director (or engine) 820 may be configured to cause the at least one processor 810 to iteratively adjust the position (or location) of the multiple standard cells and/or the position (or location) of the inter-tier connections simultaneously to converge the position (or location) of the multiple standard cells and/or the position (or location) of the inter-tier connections to optimized or legal locations. In some instances, iteratively adjusting the position (or location) of the multiple standard cells and/or the position (or location) of the inter-tier connections may include iteratively adjusting the position (or location) of the second anchor cell in the second tier and the first anchor cell in the first tier closer to each other by fixing locations of the first proxy cell and the second proxy cell in the multi-tier net to contract the multi-tier fence boundary so as to thereby converge the position (or location) of the second anchor cell in the second tier and the position (or location) of the first anchor cell in the first tier, proximate to each other.

In some implementations, the computing device 804 and the placement director (or engine) 820 may be configured for manufacturing, or causing to be manufactured, the 3DIC with multiple standard cells placed adjacent to each other in the multi-tier placement based on the adjusted position (or location) of the multiple standard cells and/or the adjusted position (or location) of the inter-tier connections in the optimized or legal locations. Thus, the computing device 804 may use the placement director (or engine) 820 to generate direct co-placement files for standard cells in multi-tier architecture and use electronic design automation (EDA) tools to perform static timing analysis (STA) and power analysis of the 3DIC architecture designs for the multi-tier co-placement of standard cells and/or inter-tier vias.

The computing device 804 may include a simulator 822 configured to cause the at least one processor 810 to generate one or more simulations of the 3DIC architecture designs for the multi-tier co-placement of standard cells and/or inter-tier vias. In various instances, the simulator 822 may include a SPICE simulator (or similar) that is configured to generate SPICE simulations of the 3DIC architecture designs. Generally, SPICE is an acronym for Simulation Program with Integrated Circuit Emphasis, which is an open source analog electronic circuit simulator. Further, SPICE is a general-purpose software program used by the semiconductor industry to check the integrity of integrated circuit designs and to predict the behavior of integrated circuit designs. Thus, in some instances, the placement director (or engine) 820 may be configured to interface with the simulator 822 to generate first timing data based on one or more simulations (including, e.g., SPICE simulations) of 3DIC architecture designs for a range of variations of operating conditions including a range of voltage variations and temperature variations.

In some implementation, the computing device 804 may include one or more databases 840 configured to store and/or record various information related to generating files for 3DIC architecture designs for the multi-tier co-placement of standard cells and/or inter-tier vias. For instance, the database(s) 840 may be configured to store information related to the 3DIC architecture designs and one or more of various timing data (including the first and second timing data) and simulated modeling data. Further, the database(s) 840 may be configured to store/record various information related to the 3DIC architecture designs in reference to simulation data (including, e.g., SPICE simulation data).

Figure 9:
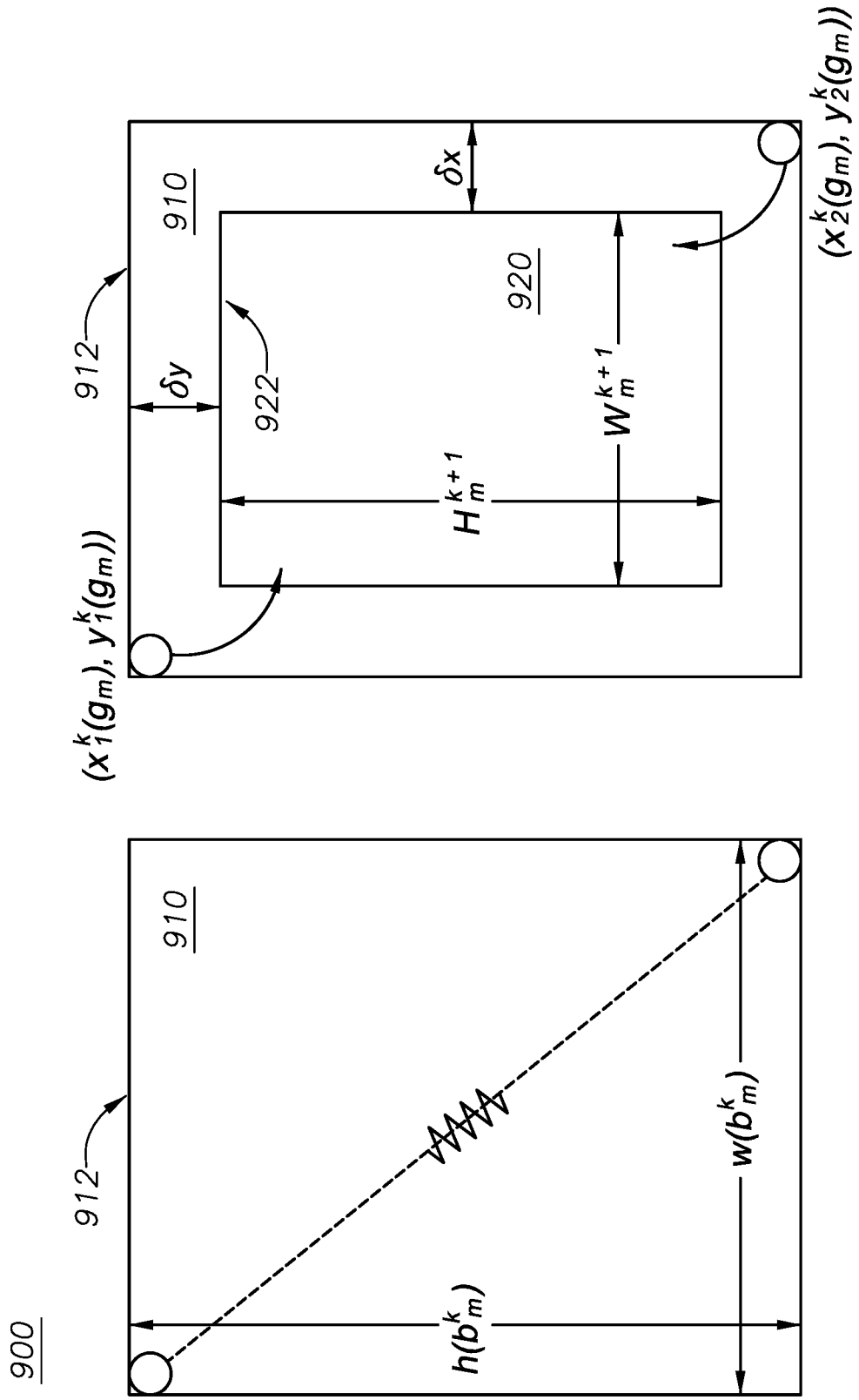
FIG. 9 illustrates a diagram of a method for iteratively adjusting a multi-tier fence boundary in accordance with various implementations described herein.

FIG. 9 illustrates a diagram of a method 900 for iteratively adjusting a multi-tier fence boundary in accordance with implementations described herein. In some cases, FIG. 9 demonstrates a technique to iteratively compute the multi-tier fence boundary for iteration of placement, wherein related notations are defined in Table 1.

TABLE 1

| | |
|---|---|
| G | The set of groups of cross-tier standard cells/inter-tier vias |
| $g_m$ | The $m^{th}$ group of standard cells and/or inter-tier vias in G |
| $x^k_1/x^k_2 (g_m)$ | The x position of $g_m$ on Tier-1/2 at $k^{th}$ iteration |
| $y^k_1/y^k_2 (g_m)$ | The y position of $g_m$ on Tier-1/2 at $k^{th}$ iteration |
| $b^k_m$ | The cross-tier xy bounding box for $g_m$ at $k^{th}$ iteration |
| $w/h(b^k_m)$ | The width/height of $b^k_m$ |
| $W^k_m$ | The region-fence width for $g_m$ at $k^{th}$ iteration |
| $H^k_m$ | The region-fence height for $g_m$ at $k^{th}$ iteration |
| $\alpha/\beta$ | The shrinking factor for region-fence width/height |

In FIG. 9, a left-side diagram 910 shows an outer box 912 of a multi-tier fence boundary, i.e., $b^k_m$ for $g_m$ from a previous (kth) placement iteration, and also a right-side diagram 920 shows an inner box 922 of an expected multi-tier fence boundary 920 for a next $((k+1)^{th})$ placement iteration. Further, FIG. 9 provides an x-y bounding box for $m^{th}$ group of standard cells and/or inter-tier vias at the $k^{th}$ iteration of the co-placement flow (left-side 910), iterative shirking of the bounding box for multi-tier fence (right-side 920).

The region-fence shrinkage for $g_m$ may be formulated as follows:

$$W_m^{k+} = \min(w(b_m^k), \alpha * W_m^k)$$

$$H_m^{k+} = \min(h(b_m^k), \beta * W_m^k)$$

Without loss of generosity, suppose $x_1^k(g_m) < x_2^k(g_m)$ and $y_1^k(g_m) > y_2^k(g_m)$, we setup the multi-tier fence for the $(k+1)^{th}$ iteration from $b^k_m$ as follows:

$$\delta x = \frac{(w(b_m^k) - W_m^{k+1})}{2}$$

$$x_1^{k+1}/x_2^{k+1}(g_m) = [x_1^k(g_m) + \delta x, \ x_2^k(g_m) - \delta x]$$

$$\delta y = \frac{(h(b_m^k) - H_m^{k+1})}{2}$$

$$y_1^{k+1}/y_2^{k+1}(g_m) = [y_2^k(g_m) + \delta y, \ y_1^k(g_m) - \delta y]$$

The convergence criteria may be design dependent, and the iterations may not have to stop after the standard cell and/or inter-tier vias are tightly packed together. One may break the iteration loop based on the quality of results, and so on.

Described herein are various implementations of a method. The method may include defining multiple tiers of an integrated circuit having multiple standard cells placed adjacent to each other in a multi-tier placement. The integrated circuit may include multi-tier nets connected with inter-tier connections. The method may include pairing the inter-tier connections as inter-tier-connection pairs belonging to a same net. The method may include grouping one or more cells of the multiple standard cells in groups with or without the inter-tier-connection pairs from multiple tiers. The method may include relating the multiple standard cells with or without the inter-tier-connection pairs within each group from the groups by generating a multi-tier fence boundary around physical locations of the multiple standard cells with or without the inter-tier-connection pairs. The method may include iteratively adjusting a position (or location) of the multiple standard cells with or without a position (or location) of the inter-tier connections so as to converge the position (or location) of the multiple standard cells with or without the position (or location) of the inter-tier connections to pre-determined optimized or legal positions (or locations).

Described herein are various implementations of a method. The method may include defining a first tier and a second tier in an integrated circuit having multiple standard cells placed adjacent to each other in a multi-tier placement. The method may include pairing a first anchor cell in the first tier with a second anchor cell in the second tier by grouping the first anchor cell and the second anchor cell in a multi-tier net and by generating a multi-tier fence boundary around the multi-tier net. The method may include iteratively adjusting the position (or location) of the second anchor cell in the second tier and the position (or location) of the first anchor cell in the first tier closer to each other by fixing locations of a first proxy cell and a second proxy cell in the multi-tier net to contract the multi-tier fence boundary so as to thereby converge the position (or location) of the second anchor cell in the second tier and the position (or location) of the first anchor cell in the first tier proximate to a same position (or location). The method may include manufacturing, or causing to be manufactured, the integrated circuit with the first and second anchor cells placed adjacent to each other in the multi-tier placement based on the adjusted position (or location) of the second anchor cell in the second tier, or vice versa.

Described herein are various implementations of a system. The system may include a processor and memory having stored thereon instructions that, when executed by the processor, cause the processor to perform various operations. The operations may include defining multiple tiers of a three-dimensional integrated circuit (3DIC) having multiple standard cells placed adjacent to each other in a multi-tier placement, wherein the integrated circuit includes multi-tier nets connected with inter-tier connections. The operations may include pairing inter-tier connections as inter-tier-connection pairs belonging to a same net. The operations may include grouping one or more cells of the multiple standard cells in groups with or without the inter-tier-connection pairs from multiple tiers. The operations may include relating the multiple standard cells with or without inter-tier-connection pairs within each group from the groups by generating a multi-tier fence boundary around physical locations of the multiple standard cells with or without the inter-tier-connection pairs. The operations may include iteratively adjusting a position (or location) of the multiple standard cells with or without a position (or location) of the inter-tier connections simultaneously to converge the position (or location) of the multiple standard cells with or without the position (or location) of the inter-tier connections to pre-determined optimized or legal positions (or locations).

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    defining a multi-tier placement of cells for an integrated circuit having multi-tier nets associated with inter-tier connections belonging to a same net;
    relating the cells with or without the inter-tier-connections within one or more groups; and
    iteratively adjusting a location of the cells with or without a location of inter-tier connections so as to converge the location of the cells.

2. The method of claim 1, wherein the integrated circuit refers to a three-dimensional integrated circuit (3DIC), and wherein the cells comprise standard cells.

3. The method of claim 1, wherein the defining the multi-tier placement of the cells for the integrated circuit comprises defining multiple tiers of the integrated circuit having the cells placed adjacent to each other in the multi-tier placement.

4. The method of claim 1, wherein the multi-tier nets are connected with one or more inter-tier connections, and wherein the method further comprises:
 relating the one or more inter-tier connections as the inter-tier-connections that belong to the same net.

5. The method of claim 4, wherein the method further comprises:
 grouping one or more of the cells in groups with or without the inter-tier-connections from the multiple tiers.

6. The method of claim 5, wherein the method further comprises:
 relating the cells with or without the inter-tier-connections within the one or more groups by generating a multi-tier fence boundary around physical locations of the cells with or without the inter-tier connections.

7. The method of claim 6, wherein the method further comprises:
 iteratively adjusting the location of the cells to optimized locations or legal locations.

8. The method of claim 7, wherein the method further comprises:
 iteratively adjusting the location of the cells with or without the location of the inter-tier connections so as to converge the location of the cells with or without the location of the inter-tier connections to the optimized locations or legal locations.

9. The method of claim 1, wherein the location of the cells with or without the location of the inter-tier connections are iteratively adjusted simultaneously so that the location of the cells with or without the location of the inter-tier connections converge to optimized locations or legal locations.

10. The method of claim 1, wherein the method further comprises:
 iteratively adjusting the location of the cells to optimized locations or legal locations; and
 manufacturing, or causing to be manufactured, the integrated circuit with the cells in the multi-tier placement based on the adjusted location of the cells with or without the adjusted location of the inter-tier connections in the optimized locations or legal locations.

11. A method comprising:
 grouping multiple physical objects in multiple tiers including grouping a first physical object in a first tier with a second physical object in a second tier; and
 iteratively adjusting a location of the second physical object in the second tier and a location of the first physical object in the first tier closer to each other thereby converging the location of the second physical object in the second tier and the location of the first physical object in the first tier proximate to a same location.

12. The method of claim 11, wherein the integrated circuit refers to a three-dimensional integrated circuit (3DIC), and wherein the cells comprise standard cells.

13. The method of claim 11, the method further comprising:
 defining the multiple tiers including the first tier and the second tier in an integrated circuit having cells placed in a multi-tier placement;
 grouping the first physical object and the second physical object in the multi-tier net by generating a multi-tier force around the multi-tier net having the first physical object and the second physical object; and
 iteratively adjusting the location of the first physical object and the location of the second physical object closer to each other by generating the multi-tier force around the multi-tier net and by fixing locations of a first proxy object and a second proxy object in the multi-tier net to contract the multi-tier force to thereby converge the location of the first physical object in the first tier and the location of the second physical object in the second tier proximate to the same location.

14. The method of claim 13, wherein:
 the integrated circuit has multiple layers that are parallel to each other,
 each layer of the multiple layers has a tier,
 the first tier has a first layer,
 the second tier has a second layer that is parallel to the first layer,
 the multiple layers are disposed to overlie each other, and
 the first tier overlies the second tier.

15. The method of claim 11, the method further comprising:
 manufacturing, or causing to be manufactured, an integrated circuit with the first physical object and the second physical object placed in a multi-tier placement based on the adjusted location of the second physical object in the second tier, or vice versa.

16. The method of claim 11, wherein the method further comprises:
 selecting one or more cells from the first tier and the second tier including selecting the first physical object from the first tier and selecting the second physical object from the second tier; and
 relating the first physical object in the first tier to the second physical object in the second tier by adding the first proxy object in the first tier in a location relative to the location of the second physical object in the second tier and by adding the second proxy object in the second tier in another location relative to the location of the first physical object in the first tier,
 wherein the grouping of the first physical object in the first tier with the second physical object in the second tier includes grouping the first physical object, the first proxy object, the second physical object, and the second proxy object in the multi-tier net and generating the multi-tier force around the multi-tier net.

17. The method of claim 11, wherein:
 the multi-tier force includes a first force and a second force;
 the first force is applied to the second physical object in the second tier in a direction towards the second proxy object to thereby converge the location of the second physical object in the second tier and the location of the first physical object in the first tier proximate to the same location; and
 the second force is applied to the first proxy object in the first tier in a direction towards the first physical object such that the second force matches the first force so as to assist with converging the location of the second physical object in the second tier and the location of the first physical object in the first tier proximate to the same location.

18. The method of claim 11, wherein:
the iteratively adjusting refers to directly constraining alignment of the location of the second physical object in the second tier with respect to the first physical object in the first tier such that the first physical object overlies the second physical object; and
the iteratively adjusting refers to using small-scale step adjustments over a number of iterations to incrementally move the second physical object in the second tier closer to the second proxy object in the second tier thereby converging the location of the second physical object in the second tier and the location of the first physical object in the first tier proximate to the same location.

19. The method of claim 11, wherein the converging the location of the second physical object in the second tier proximate to the location of the first physical object in the first tier refers to co-placement of the cells in a multi-tier placement including co-placement of the first physical object and the second physical object such that the location of the second physical object is moved within the multi-tier force to the location of the second proxy object in the second tier which is similar to the location of the first physical object in the first tier.

20. A system comprising:
a processor; and
memory having stored thereon instructions that, when executed by the processor, cause the processor to:
define a multi-tier placement of cells for an integrated circuit having multi-tier nets associated with inter-tier connections belonging to a same net;
relate the cells with or without the inter-tier-connections within one or more groups by generating a multi-tier fence boundary around locations of the cells; and
iteratively adjust a location of the cells with or without a location of the inter-tier connections so as to converge the location of the cells.

* * * * *